United States Patent
Blanchette

(10) Patent No.: US 8,075,741 B2
(45) Date of Patent: Dec. 13, 2011

(54) WATER PURIFICATION METHOD, PROCESS AND APPARATUS

(75) Inventor: Daniel Blanchette, Lévis (CA)

(73) Assignee: Daniel Blanchette, Lévis, Québec (CA)

( * ) Notice: Subject to any disclaimer, the term of this patent is extended or adjusted under 35 U.S.C. 154(b) by 750 days.

(21) Appl. No.: 12/083,951

(22) PCT Filed: Oct. 26, 2006

(86) PCT No.: PCT/CA2006/001758
§ 371 (c)(1),
(2), (4) Date: Apr. 22, 2008

(87) PCT Pub. No.: WO2007/048242
PCT Pub. Date: May 3, 2007

(65) Prior Publication Data
US 2009/0101086 A1    Apr. 23, 2009

Related U.S. Application Data

(60) Provisional application No. 60/730,046, filed on Oct. 26, 2005.

(51) Int. Cl.
*B01D 1/28*      (2006.01)
*B01D 3/36*      (2006.01)
*B01D 11/04*     (2006.01)
*C02F 1/04*      (2006.01)
*C02F 1/26*      (2006.01)

(52) U.S. Cl. ......... 203/10; 159/47.3; 202/154; 202/155; 202/170; 202/172; 202/182; 203/18; 203/24; 203/43; 203/63; 203/71; 210/639; 210/642; 210/774; 71/21; 422/260

(58) Field of Classification Search ............... 71/15, 21, 71/37, 42; 159/47.3; 203/10, 14, 18, 22, 203/24, 28, 40, 43, 44, 57, 63, 68, 70; 202/154, 202/155, 170, 172, 173, 182, 197; 210/634, 210/639, 642, 648, 774; 422/187, 260
See application file for complete search history.

(56) References Cited

U.S. PATENT DOCUMENTS

| | | | |
|---|---|---|---|
| 3,200,065 A * | 8/1965 | Cottington | 208/312 |
| 3,640,686 A | 2/1972 | Farnham | 23/181 |
| 3,669,847 A | 6/1972 | Feder et al. | 203/14 |
| 3,773,659 A | 11/1973 | Carlson et al. | |
| 4,014,271 A | 3/1977 | Rohlf et al. | |
| 4,366,032 A * | 12/1982 | Mikitenko et al. | 203/18 |
| 4,518,502 A | 5/1985 | Burns et al. | 210/634 |
| 4,654,071 A | 3/1987 | Muller | |
| 4,764,278 A | 8/1988 | Chou et al. | 210/634 |
| 5,290,451 A | 3/1994 | Koster et al. | |
| 5,294,304 A * | 3/1994 | Kano et al. | 203/19 |
| 5,296,147 A | 3/1994 | Koster et al. | |
| 5,348,624 A * | 9/1994 | Pucci et al. | 203/14 |

(Continued)

*Primary Examiner* — Virginia Manoharan
(74) *Attorney, Agent, or Firm* — Norris McLaughlin & Marcus

(57) ABSTRACT

In the water purification process, apparatus, and method, contaminated water vapor is exposed to liquid solvent, which causes a transfer of contaminants from the contaminated water vapor to the liquid solvent. In an advantageous embodiment, this latter step is followed by a second purification step where the decontaminated water in liquid phase is exposed to water vapor which causes a transfer of solvent remaining in the decontaminated water to the water vapor. The energy freed during the condensation of the vapor can advantageously be used for evaporation of the liquids, optionally by compressing the vapors prior to condensation thereof within heat exchangers.

20 Claims, 2 Drawing Sheets

U.S. PATENT DOCUMENTS

| | | |
|---|---|---|
| 5,593,473 A | 1/1997 | Marchese |
| 6,368,849 B1 | 4/2002 | Norddahl |
| 6,513,580 B1 | 2/2003 | Bourdel |
| 6,824,691 B2 | 11/2004 | Almela |
| 6,843,890 B1 * | 1/2005 | Godbole ................. 203/78 |
| 6,887,382 B2 | 5/2005 | Moutray et al. |

* cited by examiner

US 8,075,741 B2

WATER PURIFICATION METHOD, PROCESS AND APPARATUS

This application is a 371 of PCT/CA2006/001758 filed on Oct. 26, 2006, which, in turn claims priority of U.S. Provisional Patent Application No. 60/730,046, filed on Oct. 26, 2005.

TECHNICAL FIELD

The improvements relate generally to the field of contaminated water treatment, and in some embodiments, more specifically to the treatment of liquid manure.

BACKGROUND

Pork farms are known to produce a large quantity of liquid manure which is difficult to deal with environmentally. In the province of Quebec, Canada, for example, recent legislation was introduced to severely restrain the allowable contaminant concentration limits for water that is unleashed in the environment (via rivers or by watering fields for example). The major concern which led to this is that the contaminants in water, when in sufficiently high concentrations, are known to progressively work their way down into the earth and contaminate the water table. Although a portion of liquid manure from pork can be dealt with by composting, liquid manure typically includes a large percentage of water which must be reduced before the composting operation. Water is typically removed from the liquid manure by filtering and evaporation, but many contaminants form azeotropes with the water and tend to evaporate with it. Therefore, contaminants tend to follow the water vapor and upon condensation, the water still includes concentrations of contaminants which exceed the stricter environmental standards imposed by the government for liberating the water into the environment (into a stream or by irrigating a field for example). Pork producers are thus faced with a considerable challenge in disposing of the liquid manure from their swine.

There is thus a need for an improved process of treating contaminated water.

SUMMARY

An aim of the improvements is to alleviate at least some of the insufficiencies that exist concerning the treatment of contaminated water.

In accordance with one aspect, the improvements provide a method of extracting contaminants from contaminated water, the method comprising: heating the contaminated water to form a contaminated vapor; transferring contaminants from the contaminated vapor to a liquid solvent by exposing the contaminated vapor therewith, thereby providing a decontaminated azeotropic vapor containing both water vapor and solvent vapor; condensing the decontaminated azeotropic vapor into a heterogeneous liquid including condensed water and condensed solvent; and separating the heterogeneous liquid into a condensed water constituent and a condensed solvent constituent.

In accordance with one aspect, the improvements provide a process for purifying contaminated water comprising: performing a first purification step including exposing the contaminated water in vapor phase to a solvent in liquid phase to thereby substantially rid the contaminated water vapor of contaminants by transfer of the contaminants into the liquid solvent.

In accordance with another aspect, the improvements provide a water purification apparatus comprising: a first boiler where contaminated water is vaporized, a liquid solvent reservoir, and a first column having a vapor inlet connected to the first boiler, a vapor outlet, a liquid inlet connected to the liquid solvent reservoir, a liquid outlet, and means for reacting the liquid solvent and the contaminated water vapor.

BRIEF DESCRIPTION OF THE DRAWINGS

Further features and advantages of the present improvements will become apparent from the following detailed description, taken in combination with the appended drawings, in which.

It will be noted that throughout the appended drawings, like features are identified by like reference numerals.

DETAILED DESCRIPTION

Figure 1:
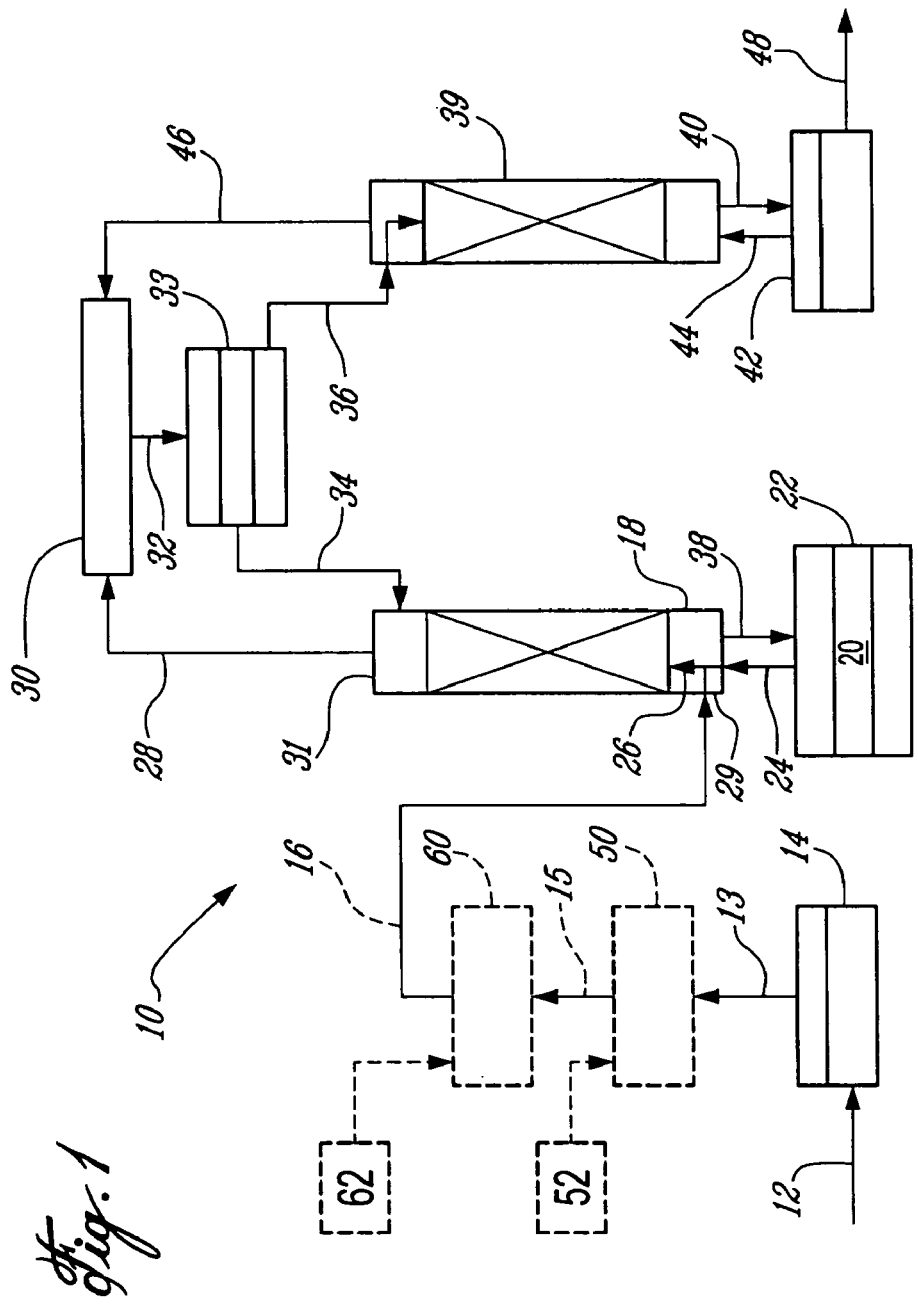
FIG. 1 is a schematic view of a process and apparatus in accordance with an embodiment of the invention.

Referring to FIG. 1, an exemplary embodiment of a water purification apparatus 10 incorporating the principles of the improvements is schematically depicted. It will be seen that in this example, the process and the apparatus include two purification stages: a first purification stage where contaminated vapor is exposed to liquid solvent which absorbs some contaminants from the vapor; and a second purification stage where the condensed water is exposed to water vapor which absorbs some solvent remaining with the condensed water.

Contaminated water 12, such as liquid manure, is fed into a first boiler 14. At least a portion of the contaminated water 12 is vaporized by the first boiler 14 and becomes contaminated vapor 13. Although some contaminants like some solid waste do not evaporate with the contaminated vapor 13, others do and a substantial portion thereof is advantageously removed by the apparatus 10. The apparatus 10 can be made to function in a steady-state mode of operation and so, during the exemplary mode of operation, contaminated water 12 is continually fed into the first boiler 14, contaminated vapor 13 is continually created, and concentrated waste is regularly or continuously removed from the first boiler 14. The contaminated vapor 13 is fed to a first column 18 where it is exposed to liquid solvent 34, into which contaminants are transferred.

In the illustrated embodiment, some of the contaminated vapor 13 condenses within the first column 18, and the condensed water is channeled into a second boiler 22 with the liquid solvent 34. The solvent and water forms an azeotropic mixture 20 which is vaporized by the second boiler 22, into an azeotropic vapor 24. The azeotropic vapor 24 is fed into the first column 18 and mixes with the contaminated vapor 13 from the first boiler to form what will be referred to as a contaminated azeotropic vapor 26. The contaminated azeotropic vapor 26 travels up the first column 18, against a flow of liquid solvent 34 and is progressively decontaminated within the first column 18, wherein contaminants are transferred into the liquid solvent 34 by equilibrium principles. At the same time, some of the liquid solvent in the column evaporates and some of the water vapors in the column condensates, having given energy in the evaporation of the liquid solvent. At the exit of the first column 18, the vapor can be said to form a decontaminated azeotropic vapor 28 wherein the solvent and water are close to equilibrium, and in which the contaminants have been substantially reduced or removed due to their transfer into the contaminated liquid solvent 38.

This first contaminant transferring stage is referred to as the first stage of the process.

The decontaminated azeotropic vapor 28 is fed into a condenser 30 in which it condensates into a heterogeneous decontaminated water and solvent mixture 32 which is fed into a separator 33 and thereby substantially separated into its water 36 and solvent 34 liquid constituents. Hence in the illustrated embodiment, it is the separated liquid solvent constituent 34 which is fed into the first column 18 and travels within it, against the flow of contaminated azeotropic vapor 26, as was described above. Alternatives to this embodiment will be described further below. At the liquid solvent 34 inlet 31 of the first column 18, which corresponds to the outlet for the azeotropic vapor 28, both the liquid solvent 34 and the azeotropic vapor 28 are substantially free of contaminants. At the liquid solvent 34 outlet 29 of the first column 18, which corresponds to the inlet for the contaminated azeotropic vapor 26, both the liquid solvent 34 and the contaminated azeotropic vapor 26 have contaminants. The contaminated azeotropic vapor 26 is progressively decontaminated as it progresses along the height of the first column 18 whereas the solvent 34 is progressively richer in contaminants as it progresses down the first column 18. The contaminated liquid solvent 38 exits the first column 18 and returns to the second boiler 22 with a percentage of condensed contaminated water.

Subsequently to the separation in the separator 33, the separated water constituent 36 still contains a certain percentage of solvent which may render it improper for discharge into the environment. Advantageously, this percentage of solvent can substantially be removed by the use of a second column 39. In the second column 39, the separated water constituent 36 is exposed to water vapor 44. Residual solvent which remains within the separated water 36 is thus progressively removed in the second column 39, wherein it is transferred to the water vapor 44 by equilibrium principles. This solvent removal stage is referred to herein as the second stage.

Thus, a substantially solvent-free and decontaminated liquid water, which will be referred to herein as "purified water" 40, exits the second column 39. The purified water 40 can be extracted at exit 48. Advantageously, at least a portion of the purified water 40 is channeled into a third boiler 42 which provides the water vapor 44 in the second column 39. The third boiler 42 vaporizes a portion of the purified water 40, to produce what will be referred to herein as "pure vapor" 44, which travels through the second column 39 against the flow of the liquid water constituent 36. Residual solvent in the liquid water constituent 36 is thus substantially transferred to the pure vapor 44 within the second column 39, via equilibrium principles, thus progressively forming an azeotropic vapor 46 of mixed water and solvent, but substantially free of contaminants. This pure azeotropic vapor 46 is thereafter also condensed, and separated into water 36 and solvent 34 constituents to be used in the second column 39 and the first column 18, respectively. Advantageously, the pure azeotropic vapor 46 from the second column 39 can be combined with the decontaminated azeotropic vapor 28 from the first column 18 prior to being condensed together 32 in the condenser 30. Thus, the heterogeneous mixture 32 of water and solvent which exits the condenser 30 and which is separated comes from a mixture of vapors 28 and 46 from the first column 18 and the second column 39 in the illustrated example. The separated water constituent 36 and solvent constituent 34 thereafter follow the previously described portions of the cycle.

The above-described process is useful in treating various types of contaminated water, and is especially useful in extracting neutral contaminants which cannot be extracted by traditional acid or alkaline washers. Its exemplary use relates to treating liquid manure in the pork industry, but it may readily be used with or without adaptation to treat contaminated water by-products of other animals, or even in treating contaminated water from other industries such as the pulp and paper, food, or petrol industries for example.

In an alternate embodiment, the first boiler 14 and the second boiler 22 can be combined into a single boiler. Using two distinct boilers is advantageous in the case of treating liquid manure because it keeps the condensed waste in the first boiler 14 from receiving solvent.

In other alternate embodiments, the second boiler can be removed or bypassed. For example, a container could alternately be used to receive the contaminated solvent 38 from the first column 18 and a filtration system and pump could be used to provide liquid solvent 34 into the first column 18. Using a second boiler is advantageous since the solvent vapors are also cleaned by the action of the liquid solvent in the first column 18. Still other alternate embodiments can use a separate source of water than the pure water 40 to provide water vapor 44 in the second column 39. Further still, the second column 39 may be entirely replaced by another system suitable for removing solvent from the liquid water, or be entirely omitted in cases where the solvent concentrations in the separated water constituent 36 are found to be tolerable.

Many types of columns for reacting a liquid and a gas exist and are known. In the illustrated embodiment, packed columns were used as the first column 18 and the second column 39. However, other types of columns may be used, like a plate tower, for example. Other possible adaptations, especially relating to using the improvements with other types of contaminants than liquid manure, will be described further below, subsequently to detailing the application of the improvements with liquid manure as the source of contaminated water.

Liquid manure from pork is highly contaminated, and typically includes solids which are preferably removed, such as by filtering, prior to the step of heating. The filtered liquid manure is then quite liquid and can still include about 3% of solids and about 97% of liquids. As a first step of a water-extraction process, the liquid manure is submitted to heat in a boiler and some of the water contained therein is evaporated.

Typically, water is evaporated until the manure includes about 30% of solids for about 70% liquids. This latter composition advantageously results in a humid mixture which can be shoveled, and which can be disposed of by composting. Many contaminants remain in the liquid, but some contaminants take gaseous form upon evaporation and form azeotropes with the water vapor, i.e., they evaporate and form a gaseous mix with the water vapor. The contaminants in the contaminated water vapor 13 can be classified into three different types: acid contaminants, alkaline contaminants, and neutral contaminants. Although known alkaline and acid washers can be used to treat the first two types of contaminants, they are typically ineffective on neutral contaminants. The apparatus 10 can advantageously be combined with an acid 50 and an alkaline 60 washer to treat the first two types of contaminants. The contaminant concentration in the contaminated water vapor exiting the washers is relatively low, but can still be considered as being non-negligible, in which case they can be advantageously dealt with using the apparatus 10 described above.

One source of contaminant which is common to contaminated water vapor evaporated from liquid manure is a high level of ammonia ($NH_3$), a gas which is soluble in water but which dissociates from water vapor. Gasses that do not condensate at room temperature and which are mixed into the contaminated vapor, such as $NH_3$, should preferably be removed prior to the first purification stage. If not removed, they may tend to accumulate within the condenser 30. This is particularly undesired when heat exchangers are used, as discussed further below, because such accumulated gasses may act as insulators and thus impede heat transfer. Gaseous $NH_3$ tends to dissociate into $NH_4^+$ and $OH^-$ (i.e., an acid and an alkaline radical) in the presence of water and is thus advantageously dealt with using an acid washer 50 (FIG. 1). Liquid manure is also known to contain hydrogen sulfide ($H_2S$). Hydrogen sulfide can be substantially removed by using an alkaline washer 60. For these and other reasons, when treating liquid manure from pork, both an acid washer 50 and an alkaline washer 60 are recommended to be used in combination with the apparatus 10. Typically, the acid washer 50 and alkaline washer 60 are used between the first boiler 12 and the first column 18, and serve to substantially remove most acid and alkaline contaminants from the contaminated water vapor 13.

The acid and alkaline washers 50, 60 are typically columns in which the contaminated water vapor 13 travels and is exposed to a high area of alkaline 52 or acid 62 liquid surface which travels in the opposite directions. The principle of columns is well known in the art and several manufacturers present different types of columns for different applications.

In the acid washer 50, an alkaline liquid 52 reacts with the acids in the contaminated water vapor 13, which results in the formation of salts. Preferably, ammonium sulfate is produced which can advantageously be used as a fertilizer on nearby farms. The contaminated vapor 15 exiting the acid washer 50 is thus substantially ridden of the acid contaminants. Similarly, an acid liquid 62 is fed into the alkaline washer 60 which reacts with the alkaline in the contaminated water vapor 15 and creates salts. The water vapor 16 exiting both washers 50, 60 is then fed into the first column 18, and follows on to the remaining steps of the process as previously described.

It will be noted here that it was found advantageous in the case of treating liquid manure to add acid in the contaminated water 12 prior to its heating in the first boiler 14. This has led to an increased extraction of ammonia. In the treatment of liquid manure, sulfuric acid can advantageously be used as the acid added in the contaminated water 12 and/or used in the basic washer 60, since sulfuric acid yields ammonium sulfate when reacted with ammonia, a by-product which can be used in fertilizers.

From the above, it can be seen that one role of the solvent in the liquid manure applications is to absorb the contaminants which remain in the contaminated water vapor 16 subsequently to the acid 50 and alkaline 60 washing, although the washers may not be essential to other embodiments of the invention. As described above, the process separates the solvent 34 and the water 36 constituents from the mixture 32. The solvent therefore preferably has the following characteristics: it is adapted to form an azeotropic mixture 20 with water such that a sufficient quantity thereof will evaporate with the water in the second boiler 22; it is relatively insoluble in water to form a heterogeneous liquid with water 32, so as to be separable therefrom; it is not poisonous; it is in liquid state at room temperature; and in its liquid state, it has the properties of absorbing the gaseous contaminants which it is intended to absorb. Although hydrocarbons such as pentane, heptane and nonane are believed to provide suitable solvents in other applications, alcohols have been found to provide advantageous solvent characteristics when used to treat the types of contaminants found in liquid manure.

Alcohols are a large family of molecules typically characterized in that they contain one or more hydrocarbon groups and one or more hydroxyl (—OH) groups. The alcohol family include the progressively heavier following members: ethanol, butanol, n-amyl alcohol, hexyl alcohol and octanol. The evaporation temperatures of the preceding members progressively increases with their "weight". Furthermore, the azeotropic weight ratio of the quantity of the member which evaporates with a respective quantity of water progressively decreases with their "weight". For example, butanol has an evaporation temperature of about 118° C., and when mixed with water, it forms an azeotropic vapor mixture having 55% of butanol and 45% of water vapor (ratio of 1.22:1). In contrast, octanol evaporates at about 195° C., and forms an azeotrope having 10% octanol and 90% of water vapor (ratio of 0.11:1). Increasing the quantity of solvent that is evaporated typically results in a better wash (i.e., lower percentage of contaminants remaining in the water vapor). However it also results in a higher concentration of solvent remaining within the separated water constituent 36 which must be washed in the second column 39. Although it may not be a determinative concern, one should also consider the energy costs of evaporating the solvent. Typically, when the solvent having a first evaporation temperature is heated with water having a second evaporation temperature, the azeotrope formed by the mixture thereof will have a third evaporation temperature which is typically below the first and second evaporation temperatures. In the case of butanol for example, the evaporation temperature of the butanol-water azeotrope is of 92° C. For these and other reasons which will appear with respect to the description of the exemplary thermodynamic cycle, described further down, hexyl alcohol has been found to provide satisfying characteristics in liquid manure applications.

Hexyl alcohol has an evaporation temperature of about 158° C., and forms an heterogeneous azeotrope with water that has an evaporation temperature of about 98° C. and an evaporation ratio of about 0.5:1. Solvents other than hexyl alcohol may be found to provide better results or to be better adapted to treat contaminants from a different source. Applications such as industrial uses with higher contaminant concentrations, for example, may require a solvent with greater evaporation ratio, or other suitable characteristics.

From the above, one will no doubt appreciate the purifying effect of the apparatus 10 on contaminated water, but will probably be led to ponder as to what the additional energetic costs related to evaporating the solvent and water in the second 22 and third 42 boilers represent. One wonders if such an apparatus would be economically viable. As it is shown if FIG. 2, the energetic costs of the apparatus can be greatly reduced by implementing the following thermodynamic concept.

Figure 2:
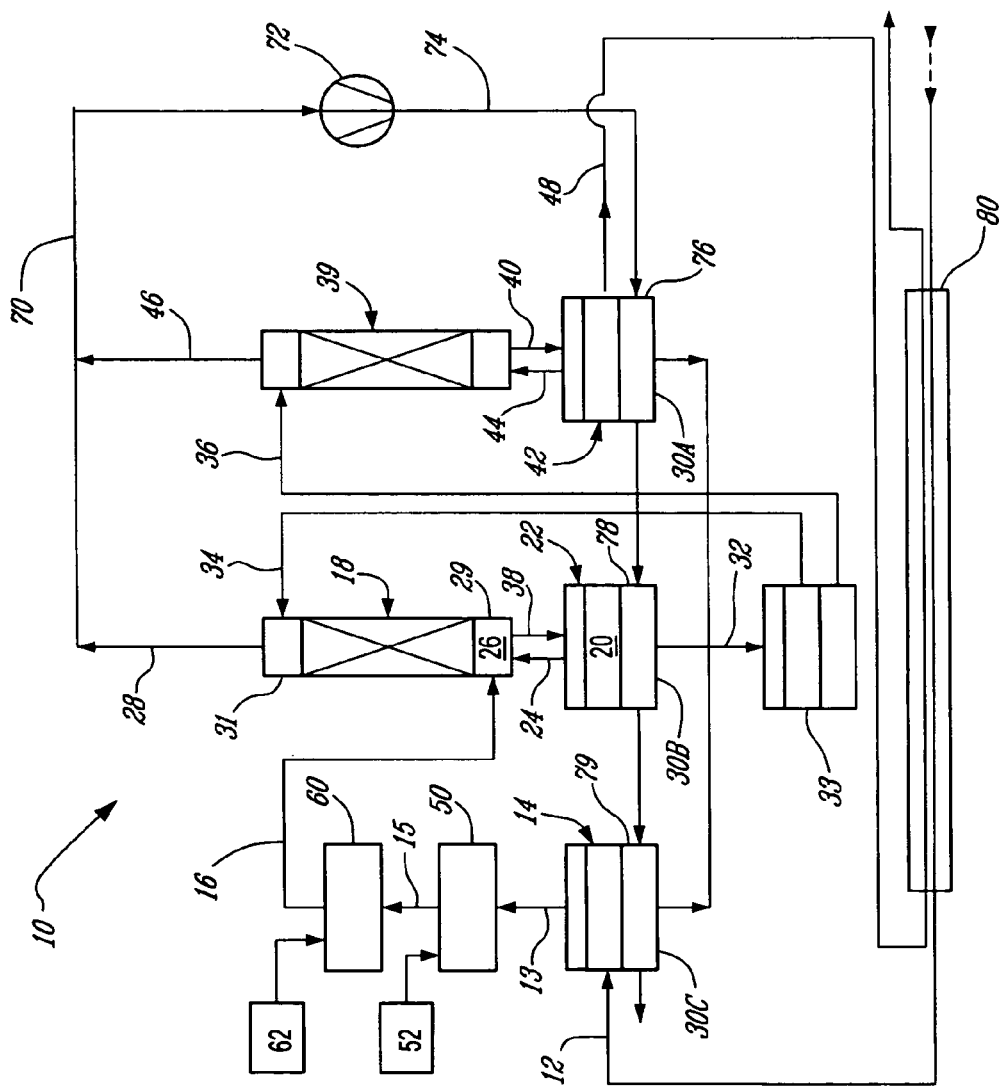
FIG. 2 is a schematic view of the process and apparatus of FIG. 1 additionally including a heat exchange system.

Turning now to FIG. 2, a liquid manure heat exchanger 80 can advantageously be used to heat the liquid manure 12 using the energy of the pure water 48 which is hot when exiting the second column 39. The azeotropic vapors 28 and 46 from the first column 18 and second column 39 can be combined into a combined azeotropic vapor 70. A compressor 72 can advantageously be used upstream of the condenser 30 and compress the combined azeotropic vapor 70, thus increasing the internal energy and condensation temperature thereof and forming a compressed azeotropic vapor 74. The energy liberated by the condensation of this compressed azeotropic vapor 74 can then be used in generating at least one of the vapors used in the system by using heat exchangers.

In the illustrated embodiment, the compressed azeotropic vapor 74 is condensed within three successive heat exchangers 76, 78, and 79, respectively connected with the third boiler 42, the second boiler 22 and the first boiler 14, respectively. The heat exchangers 76, 78, and 79, can be considered as a first part 30A, a second part 30B, and a third part 30C of the condenser. The step of compression by the compressor 72 raises the condensation temperature of the compressed azeotropic vapor 74 above the evaporation temperature of water (100° C.). The energy released by the condensation of the azeotropic vapor is thus released efficiently within the boilers and is thus recuperated in vaporizing the contaminated water 12, the azeotropic mixture 20 and the pure water 40. Possible alternate embodiments include using the condensation energy with only one or two boilers instead of all three.

In the embodiment wherein liquid manure from pork production is treated, hexyl alcohol can advantageously be used. The water-hexyl alcohol azeotrope has an evaporation temperature of about 98° C. Its vapor is can advantageously be compressed by about 5 psi above atmospheric pressure, to about 1.4 atmosphere, which raises the internal energy and brings the evaporation/condensation temperature to about 108° C. The difference in temperature $\Delta T_3$ between the condensing azeotrope mixture and the boiling pure water 40 in the third boiler is thus of 8° C. In the second boiler 22, the $\Delta T_2$ is thus of 10° C. (since the azeotrope boils at 98° C. at one atmosphere), and in the first boiler 14 the $\Delta T_1$ is of 8° C.

For a given desired heat exchange rate, the greater the $\Delta T$, the lower the heat exchange surface will be needed. There is thus an interest in increasing the condensation temperature of the azeotrope by increasing the pressure. However, there is a cost in energy at the compressor 72 in increasing the pressure and a compromise must be achieved between the increase in pressure and the size and efficiency achievable with the heat exchangers. For exemplary purposes, the overall energy consumption experimentally achieved using the apparatus 10 with the heat exchangers as described was only about 30% higher than for boiling alone (using hexyl alcohol as the solvent). Using a prototype apparatus having neither acid nor alkaline washers, using hexyl alcohol as the solvent, and operating for four consecutive days, pure water 48 having less than 10 ppm of C.O.D., less than 0.02 ppm of phosphorus, less than 1 ppm of nitrogen, and less than 0.1 ppm of potassium was obtained. Once the system operates in steady-state, it is an aim that the input energy be solely provided by the compressor 72 which compensates for all losses of the system. In steady-state operation, thus, the energy of the hot pure water 48 is used to heat the liquid manure 12, prior to entry into the first boiler 14, contaminated water 13 is evaporated in the first boiler 14 using the energy from the condensing compressed vapors 74, and energy from the condensing compressed vapors 74 is also used in evaporating the azeotropic vapor 24 from the second boiler 22 using the second heat exchanger 78, and in evaporating the water vapor 44 from the third boiler 42 using the first heat exchanger 76. Given the teachings of the present description, it is believed that the energy losses in the process can be minimized by routine process optimization.

The importance of the temperature differences when using the heat exchangers has thus been illustrated. This becomes yet another factor to consider when choosing an appropriate solvent. In fact, if say butanol was used in a particular application, one understands that the temperature difference $\Delta T$ at the first 14 and third 42 boilers for a same increase in pressure will be less than when using hexyl alcohol. The reason is that butanol creates an azeotrope with water that boils at 92° C. instead of 98° C. for hexyl alcohol. Therefore, if an increase of 10° C. is achieved, the azeotrope will only condense at 102° C. which leaves only a 2° C. difference with the first 14 and third 42 boilers. The heat exchangers in this case would therefore have to be bigger than if hexyl alcohol was used. The balance of advantages of using butanol as the solvent may still prove advantageous in certain applications, like where a more thorough wash is needed.

An alternate way which has been envisaged to recuperate energy is referred to as the multi-effect principle. In the multi-effect principle, a number of water purification processes are used in parallel. The pressure in the boilers is kept successively lower from one purification process to the next, thus maintaining the evaporation temperature in each boiler successively lower than the evaporation temperature in the boiler of the previous process. The energy from the condensation of each successive process can then be recuperated in at least one boiler of the next process. This can yield satisfactory results in certain applications.

The embodiments of the improvements described above are intended to be exemplary only. Other alternate embodiments will appear to those contemplating the present disclosure and such alternate embodiments are intended to be within the scope of the invention. For example, using different types of solvents, using an appropriate type columns, boilers and heat exchangers, are all left to the choice of those skilled in the art realizing particular embodiments of the invention. The scope of the improvements is intended to be limited solely by the scope of the appended claims.

What is claimed is:

1. A method of extracting contaminants from contaminated water, the method comprising:
   heating the contaminated water to form a contaminated vapor;
   transferring contaminants from the contaminated vapor to a liquid solvent by exposing the contaminated vapor therewith, thereby providing a decontaminated azeotropic vapor containing both water vapor and solvent vapor;
   condensing the decontaminated azeotropic vapor into a heterogeneous liquid including condensed water and condensed solvent; and
   separating the heterogeneous liquid into a condensed water constituent and a condensed solvent constituent further comprising:
   recuperating a heterogeneous mixture of solvent and water in liquid phase subsequently to said step of transferring;
   heating the heterogeneous mixture into an azeotropic vapor;
   integrating the azeotropic vapor into the contaminated vapor prior to the step of transferring; and
   using at least a portion of the condensed solvent constituent as the liquid solvent in the step of transferring.

2. A method of extracting contaminants from contaminated water, the method comprising:
   heating the contaminated water to form a contaminated vapor;
   transferring contaminants from the contaminated vapor to a liquid solvent by exposing the contaminated vapor therewith, thereby providing a decontaminated azeotropic vapor containing both water vapor and solvent vapor;
   condensing the decontaminated azeotropic vapor into a heterogeneous liquid including condensed water and condensed solvent; and
   separating the heterogeneous liquid into a condensed water constituent and a condensed solvent constituent further comprising:
   heating liquid water into a water vapor; and
   transferring solvent remaining in the condensed water constituent from the separating step to the water vapor by exposing the condensed water constituent therewith;

integrating the water vapor into the decontaminated azeotropic vapor prior to the step of condensing and subsequently to the step of transferring solvent.

3. The method of claim 1 further comprising using energy freed during the step of condensing in the step of heating.

4. The method of claim 3 further comprising increasing the pressure of the decontaminated azeotropic vapor.

5. A process for purifying contaminated water comprising:
performing a purification step including exposing the contaminated water in vapor phase to a solvent in liquid phase to thereby substantially rid the contaminated water vapor of contaminants by transfer of the contaminants into the liquid solvent;
wherein the solvent used forms a heterogeneous azeotrope with water, further comprising recuperating a mixed contaminated liquid solvent and liquid water condensed during the purification step, vaporizing the recuperated liquids into a contaminated azeotropic vapor; additionally exposing the contaminated azeotropic vapor to the solvent in liquid phase to thereby substantially rid the contaminated azeotropic vapor of contaminants by transferring of the contaminants into the liquid solvent in the purification step; condensing the decontaminated water and solvent vapors from the purification step together into a heterogeneous liquid;
substantially separating the heterogeneous liquid into a liquid water constituent and a liquid solvent constituent; and channeling the separated liquid solvent constituent into the purification step.

6. The process of claim 5 wherein the recuperated liquids are vaporized separately from the contaminated water.

7. The process of claim 5 further comprising using energy liberated during the condensing to vaporize at least one of the contaminated water and the recuperated liquids.

8. The process of claim 7 further comprising compressing the decontaminated water and solvent vapors prior to the condensing.

9. A process for purifying contaminated water comprising:
performing a first purification step including exposing the contaminated water in vapor phase to a solvent in liquid phase to thereby substantially rid the contaminated water vapor of contaminants by transferring of the contaminants into the liquid solvent;
further comprising: subsequently to the first purification step, performing a second purification step including exposing the decontaminated water in liquid phase to water in vapor phase to thereby substantially rid the decontaminated liquid water of solvent by transferring of the solvent into the water vapor; wherein the solvent used forms a heterogeneous azeotrope with water, further comprising:
condensing the water and solvent vapors from the second purification step together into a heterogeneous liquid; substantially separating the heterogeneous liquid into a liquid water constituent and a liquid solvent constituent; channeling the separated liquid solvent constituent into the first purification step; and channeling the separated liquid water constituent into the second purification step.

10. The process of claim 9, further comprising:
recuperating a mixed contaminated liquid solvent and liquid water condensing within the first purification step, vaporizing the recuperated liquids into a contaminated azeotropic vapor; additionally exposing the contaminated azeotropic vapor to the solvent in liquid phase to thereby substantially rid the contaminated azeotropic vapor of contaminants by transferring of the contaminants into the liquid solvent in the first purification step; and condensing the decontaminated water and solvent vapors from the first purification step together with the water and solvent vapors from the second purification step into the heterogeneous liquid.

11. The process of claim 10 wherein the recuperated liquids are vaporized separately from the contaminated water.

12. The process of claim 9 further comprising using energy liberated during the condensing to vaporize at least one of the vapors used in the process.

13. The process of claim 12 further comprising compressing the decontaminated water and solvent vapors prior to the condensing.

14. A process for purifying contaminated water comprising:
performing a purification step including exposing the contaminated water in vapor phase to a solvent in liquid phase to thereby substantially rid the contaminated water vapor of contaminants by transferring of the contaminants into the liquid id solvent; further comprising treating the contaminated water with an acid washer and a basic washer prior to the purification step.

15. The process of claim 14 wherein the contaminated water is of liquid manure provenance.

16. The process of claim 15 wherein the solvent is hexyl alcohol.

17. A water purification apparatus comprising:
a first boiler where contaminated water is vaporized, a liquid solvent reservoir, and a first column having a vapor inlet connected to the first boiler, a vapor outlet, a liquid inlet connected to the liquid solvent reservoir, a liquid outlet, and means for reacting the liquid solvent and the contaminated water vapor; a second boiler having a liquid inlet connected to the liquid outlet of the first column, and a vapor outlet connected to the vapor inlet of the first column; a condenser connected to the vapor outlet of the first column; and a separator connected downstream of the condenser and having the liquid solvent reservoir and a decontaminated water reservoir; and
a second column having a liquid inlet connected to the decontaminated water reservoir, a water outlet, a vapor inlet, a vapor outlet connected to the condenser, and means for reacting the liquid water with water vapor; and a third boiler connected both to the water outlet and to the vapor inlet of the second column.

18. The apparatus of claim 17 further comprising a heat exchanger connected between an outlet of the third boiler and an inlet of the first boiler.

19. A water purification apparatus comprising: at least one boiler where contaminated water is vaporized, a liquid solvent reservoir, and a first column having a vapor inlet connected to the first boiler, a vapor outlet, a liquid inlet connected to the liquid solvent reservoir, a liquid outlet, and means for reacting the liquid solvent and the contaminated water vapor; a condenser comprising at least one heat exchanger connected to the at least one boiler and further comprising a compressor connected upstream of the condenser.

20. A water purification apparatus comprising: a boiler where contaminated water is vaporized, a liquid solvent reservoir, and a column having an inlet connected to the first boiler, a vapor outlet, a liquid inlet connected to the liquid solvent reservoir, a liquid outlet, and means for reacting the solvent and the contaminated water vapor; further comprising an acid washer and a basic washer connected between the boiler and the column.

* * * * *